(12) United States Patent
van Drieënhuizen et al.

(10) Patent No.: US 6,695,457 B2
(45) Date of Patent: Feb. 24, 2004

(54) BULK SILICON MIRRORS WITH HINGES UNDERNEATH

(75) Inventors: Bert P. van Drieënhuizen, Fremont, CA (US); Nelson Kuan, Palo Alto, CA (US); Jeffrey P. Wilde, Morgan Hill, CA (US)

(73) Assignee: Capella Photonics, Inc., San Jose, CA (US)

( * ) Notice: Subject to any disclaimer, the term of this patent is extended or adjusted under 35 U.S.C. 154(b) by 0 days.

(21) Appl. No.: 10/159,153

(22) Filed: May 31, 2002

(65) Prior Publication Data

US 2004/0017625 A1 Jan. 29, 2004

Related U.S. Application Data

(60) Provisional application No. 60/295,682, filed on Jun. 2, 2001.

(51) Int. Cl.$^7$ .............................................. G02B 7/182
(52) U.S. Cl. .................... 359/872; 359/223; 359/224; 359/225; 359/290
(58) Field of Search .............................. 358/872, 224, 358/223, 290, 291, 295, 315, 318, 876, 871, 873, 874, 875, 225, 226, 850; 356/345, 346

(56) References Cited

U.S. PATENT DOCUMENTS

| | | | | | |
|---|---|---|---|---|---|
| 4,360,182 | A | * | 11/1982 | Titus .......................... | 248/371 |
| 5,239,361 | A | * | 8/1993 | Burch ......................... | 356/451 |
| 5,920,417 | A | * | 7/1999 | Johnson ....................... | 359/223 |
| 6,028,689 | A | * | 2/2000 | Michalicek et al. ........ | 359/224 |
| 6,201,629 | B1 | * | 3/2001 | McClelland et al. ........ | 359/223 |
| 6,275,325 | B1 | * | 8/2001 | Sinclair ....................... | 359/291 |
| 6,292,600 | B1 | * | 9/2001 | Goldstein et al. ............ | 385/18 |
| 6,533,947 | B2 | * | 3/2003 | Nasiri et al. .................. | 216/2 |
| 6,585,383 | B2 | * | 7/2003 | Helkey ........................ | 359/871 |
| 6,600,851 | B2 | * | 7/2003 | Aksyuk et al. ............... | 385/18 |

FOREIGN PATENT DOCUMENTS

WO          WO 01/94253 A2       12/2001

OTHER PUBLICATIONS

Tuantranont, et al., "Bulk–Etched Surface Micromachined And Flip–Chip Integrated Micromirror Array For Infrared Applications"; 2000 IEEE/LEOS International Conference on Optical MEMS, IEEE Catelog #: 00EX399, Sheraton Kauai, Resort, Kauai, Hawaii Aug. 21–24, 2000, pp. 71–72.

* cited by examiner

*Primary Examiner*—Mohammad Sikder
(74) *Attorney, Agent, or Firm*—Gray Cary Ware & Freidenrich LLP

(57) ABSTRACT

This invention provides method and apparatus for fabricating a MEMS apparatus having a bulk element with hinges underneath. The bulk element may comprise single-crystal silicon, fabricated by way of bulk micromachining techniques. The hinges may be made of thin-films, fabricated by way of surface micromachining techniques. A distinct feature of the MEMS apparatus of the present invention is that by disposing the hinges underneath the bulk element, the surface of the bulk element can be maximized and the entire surface becomes usable (e.g., for optical beam manipulation). Such a feature would be highly advantageous in making arrayed MEMS device, such as an array of MEMS mirrors with a high optical fill factor. Further, by advantageously making use of both bulk and surface micromachining techniques, a MEMS mirror thus produced is equipped with a large and flat mirror along with flexible hinges, hence capable of achieving a substantial rotational range at modest electrostatic drive voltages.

16 Claims, 8 Drawing Sheets

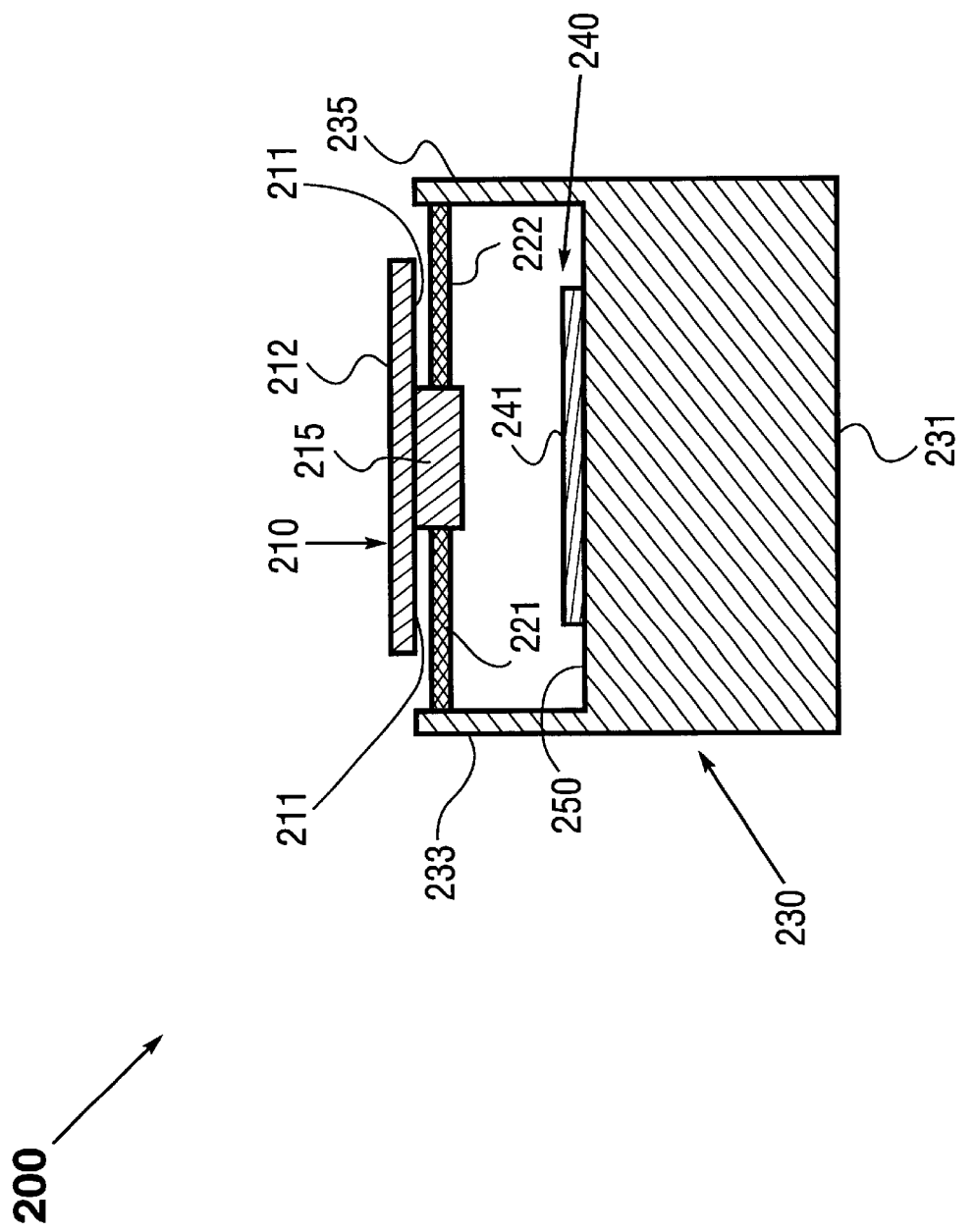

BULK SILICON MIRRORS WITH HINGES UNDERNEATH

CROSS-REFERENCE TO RELATED APPLICATIONS

This application claims priority of U.S. Provisional Patent Application No. 60/295,682, filed on Jun. 2, 2001, which is incorporated herein by reference for all purposes.

FIELD OF THE INVENTION

This invention relates generally to micro-electromechanical systems (MEMS). In particular, it provides method and system for making MEMS mirrors by a combination of bulk and surface micromachining techniques.

BACKGROUND OF THE INVENTION

MEMS mirrors have demonstrated to be effective in a variety of applications, including high-speed scanning and optical switching. In such applications, it is essential for MEMS mirrors to have flat optical surfaces, large rotational range, and robust performance.

Many applications (e.g., optical networking applications) further require that MEMS mirrors be configured in a closely packed array. It is therefore desirable to maximize the "optical fill factor" of the array (i.e., by making the optical surface of each constituent mirror as large as possible), without compromising other essential characteristics.

MEMS mirrors are conventionally made by either bulk or surface silicon micromachining techniques. Bulk micromachining, which typically produces single-crystal silicon mirrors, is known to have a number of advantages over surface micromachining, which typically produces polysilicon (or thin-film) mirrors. For example, single-crystal silicon mirrors produced by bulk micromachining techniques are generally thicker and larger mirrors with smoother surfaces and less intrinsic stress than polysilicon (or thin-film) mirrors. Low intrinsic stress and sizeable thickness result in flat mirrors, while smooth surfaces reduce light scattering. An advantage inherent to surface micromachining techniques is that the mirror suspension (e.g., one or more thin-film hinges) can be better defined and therefore made smaller. This allows the MEMS mirror thus produced to have a large rotational range, e.g., at moderate drive voltages.

U.S. Pat. No. 6,028,689 of Michalicek et al. ("Michalicek et al.") discloses a movable micromirror assembly, driven by an electrostatic mechanism. The assembly includes a mirror supported by a plurality of flexure arms situated under the mirror. The flexure arms are in turn mounted on a support post. Because the assembly disclosed by Michalicek et al. is fabricated entirely by way of surface micromachining techniques, the resulting "micromirror" is of the polysilicon (thin-film) type and is thus subject to the aforementioned disadvantages.

International Patent Application Number WO 01/94253 A2 of Chong et al. discloses a MEMS mirror device having a bulk silicon mirror attached to a frame by thin-film hinges. A notable shortcoming of this system is evident in that the thin-film hinges extend from the reflective surface side of the mirror to the frame, hence restricting (or obstructing) the amount of surface area available for optical beam manipulation. This shortcoming further results in a lower optical fill factor in an array of such MEMS devices.

Tuantranont et al. disclose an array of deflectable mirrors fabricated by a surface micromachining polysilicon (or "MUMPS") process in "Bulk-Etched Micromachined and Flip-Chip Integrated Micromirror Array for Infrared Applications," 2000 IEEE/LEOS International Conference on Optical MEMS, 21024, Kauai, Hawaii (August 2000). In this case, an array of polysilicon mirror plates is bonded to another array of thermal bimorph actuators by gold posts using the "flip-chip transfer technique", resulting in trampoline-type polysilicon plates each suspended at its corners by thermal bimorph actuators. In addition to the mirror plates made of polysilicon (or thin-film), another drawback of the thus-constructed mirror array is the lack of a monolithic structure, which makes the array susceptible to misalignment and other extraneous undesirable effects.

In view of the foregoing, there is a need in the art to provide a novel type of MEMS mirrors that overcomes the limitations of prior devices in a simple and robust construction.

SUMMARY OF THE INVENTION

The present invention provides a MEMS apparatus, including a bulk element; a support; and one or more hinges. The bulk element comprises a device surface and a bottom surface that is situated below the device surface. The hinges are disposed below the bottom surface of the bulk element and couple the bulk element to the support, whereby the bulk element is suspended from the support.

In the above apparatus, the support may include a cavity, in which the hinges are disposed. There may be at least one electrode disposed in the cavity, for causing the bulk element to be actuated. The device surface of the bulk element may further contain a reflective layer (e.g., a metallic film), rendering the apparatus thus constructed a MEMS mirror.

In the present invention, the term "bulk element" refers to an element fabricated by bulk micromachining techniques known in the art, which typically comprises a single-crystal material. A case in point may be a single-crystal silicon element. The bulk element is characterized by a "device" surface and a "bottom" surface that is situated below the device surface (while the bulk element itself may assume any geometric form deemed suitable). The "device" surface of the bulk element may be optically reflective. It may also be used as an "interface" for coupling the bulk element to other devices, if so desired in a practical application. Further, a "support" may be a frame or substrate, to which the bulk element is attached. A "hinge" (or "hinge element") should be construed broadly as any suspension/coupling means that enables the bulk element to be suspended from the support and further provides the restoring force as the bulk element undergoes motion. For instance, a hinge may be a flexure or flexible coupling, e.g., fabricated by a bulk or surface micromachining technique known in the art. The term "underneath" refers to the hinges being anchored to (or below) the bottom surface of the bulk element and thereby disposed wholly beneath the device surface. This allows the device surface of the bulk element to be maximized and the entire surface to be usable (e.g., for optical reflection).

The present invention further provides a process flow (or method) that may be used for fabricating the aforementioned MEMS apparatus. In one embodiment of a process flow according to the present invention, a "device" component is formed. The device component in one form may be provided by an SOI (Silicon-On-Insulation) wafer, comprising a single-crystal silicon device layer and a silicon handle wafer with an insulation layer (e.g., silicon oxide) sandwiched in between. First and second hinge elements may be fabricated on a first surface of the single-crystal silicon layer, e.g., by way of surface micromachining techniques. A "support" component is configured to contain a cavity, in which at least one electrode may be disposed. Subsequently, the device and support components are bonded in such a manner that the hinge elements are disposed within the cavity. The silicon handle wafer along with the insulation layer in the device component is then removed, thereby revealing a second surface of the single-crystal silicon device layer. A bulk element may be subsequently produced in the single-crystal silicon device layer by way of bulk micromachining techniques, characterized by the first and second surfaces. The configuration may be such that the hinge elements are each anchored to the first (or "bottom") surface of the bulk element on one end and to the support component on the other, thereby enabling the bulk element to be suspended with the hinge elements wholly underneath the second (or "device") surface. A reflective layer may be further deposited on the device surface of the bulk element, rendering the apparatus thus constructed a MEMS mirror.

One advantage of the MEMS apparatus of the present invention is that by placing the hinge elements underneath the bulk element, the device surface of the bulk element can be maximized and the entire surface becomes usable (e.g., for optical beam manipulation). Such a feature would be highly advantageous in making arrayed MEMS devices, such as an array of MEMS mirrors with a high optical fill factor. Further, by advantageously making use of both bulk and surface micromachining techniques, a MEMS mirror of the present invention is equipped with a large and flat mirror along with flexible hinges, and is hence capable of achieving a substantial rotational range at moderate electrostatic drive voltages. An additional advantage of the MEMS apparatus of the present invention is evident in its monolithic structure, rendering it robust in performance. These advantageous features are in notable contrast with the prior devices described above.

The novel features of this invention, as well as the invention itself, will be best understood from the following drawings and detailed description.

BRIEF DESCRIPTION OF THE FIGURES

FIG. 2 is a schematic side sectional view of a second embodiment of a MEMS apparatus, according to the present invention;

DETAILED DESCRIPTION

Figure 1A:
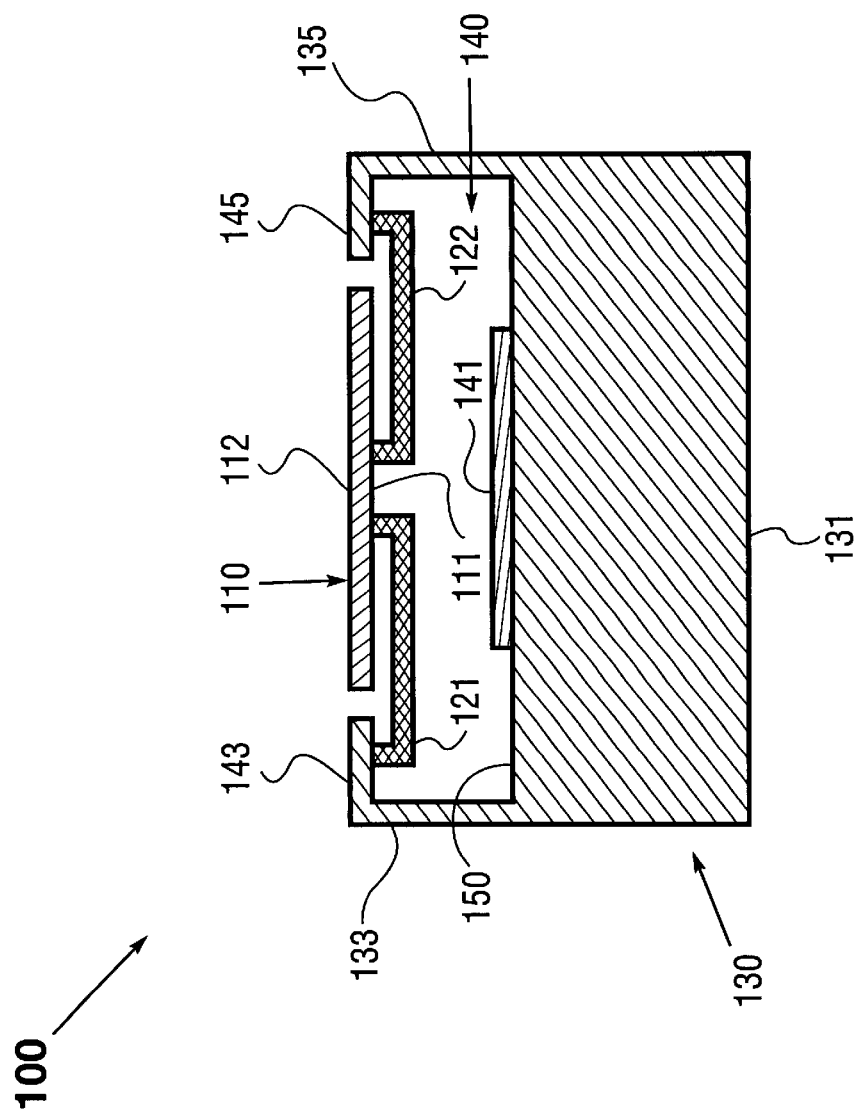
FIG. 1A is a schematic side sectional view of a first embodiment of a MEMS apparatus, according to the present invention.
Figure 1B:
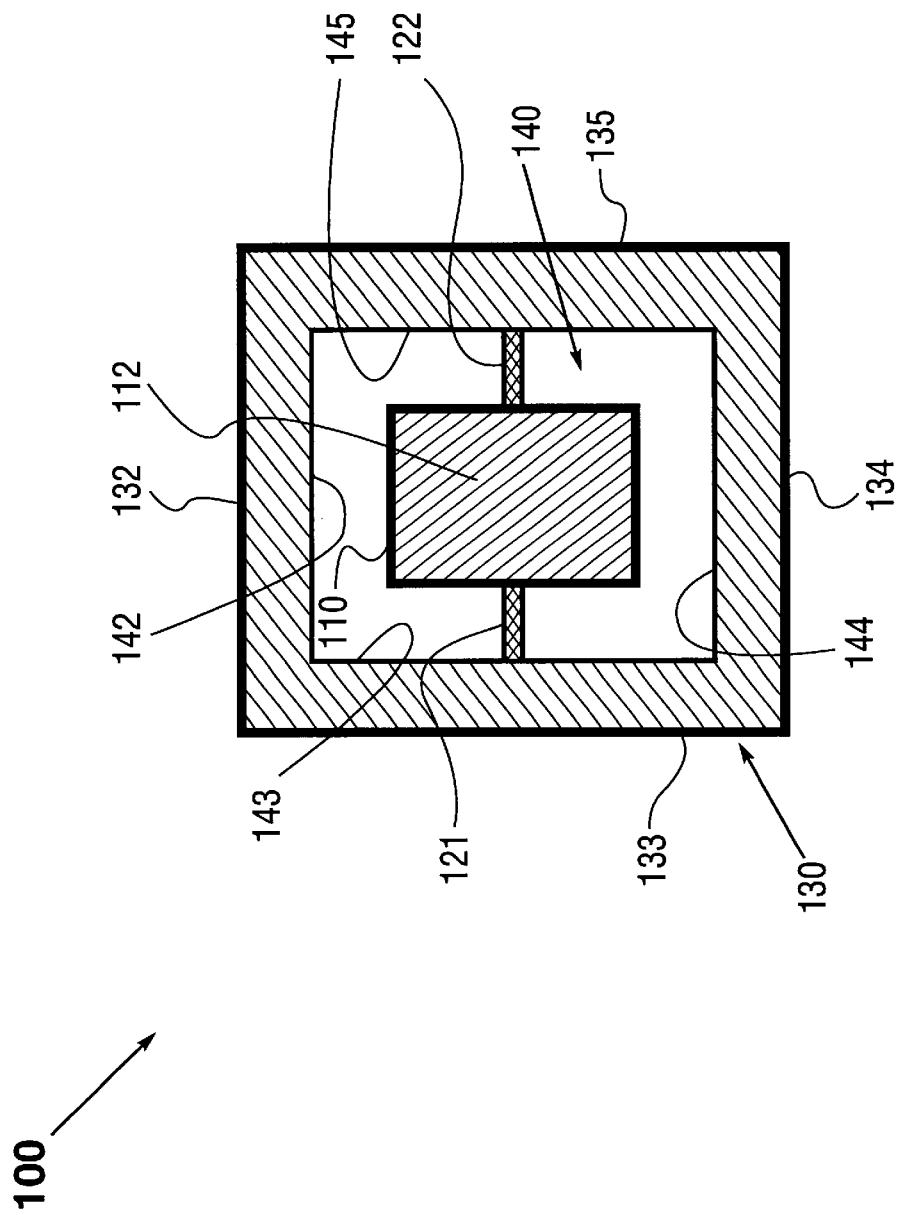
FIG. 1B is a schematic top view of a first embodiment of a MEMS apparatus, according to the present invention.

FIGS. 1A–1B illustrate a first embodiment of a MEMS apparatus, according to the present invention. FIG. 1A depicts a schematic side sectional view of a MEMS apparatus 100, comprising a bulk element 110; first and second hinge elements 121, 122; and a support 130. The bulk element 110 may have a "device" (or "top") surface 112, and a "bottom" surface 111 which is disposed below and opposes the device surface 112. The first and second hinge elements 121, 122 are each disposed below the device surface 112. As a way of example in the embodiment of FIG. 1A, the hinge elements 121, 122 are each coupled to the bottom surface 111 of the bulk element 110 on one end and to the support 130 on the other. In this manner, the bulk element 110 is suspended with the hinge elements 121, 122 disposed wholly underneath the device surface 112.

FIG. 1B shows a schematic top view of the MEMS apparatus 100. By way of example, the device surface 112 of the bulk element 110 is shown to be generally rectangular in shape. It will be appreciated that this need not be case; in fact, the device surface of a bulk element (or the bulk element itself) in the present invention may assume any geometric form (e.g., elliptical) that is deemed suitable for a given application.

In the embodiment of FIGS. 1A–1B, the support 130 may include a substrate portion 131 and a cavity 140. By way of example, the substrate portion 131 may be generally rectangular in shape. A plurality of sidewalls 132, 133, 134, 135 may extend from the portion 131 and thereby form the cavity 140. As shown in FIG. 1A, the hinge elements 121, 122 are disposed within the cavity 140, and are coupled respectively to the sidewalls 133, 135. In the embodiment of FIGS. 1A–1B, each of the sidewalls 132, 133, 134, 135 may include a corresponding ridge (or "lip") portion 142, 143, 144, 145 that projects inward from the respective sidewall (see the ridge portions 143, 145 shown in FIG. 1A, for example). Furthermore, the hinge elements 121, 122 have a generally "C"-shaped (side-view) cross-section, and are coupled to the ridge portions 143, 145 of the sidewalls 133, 135, respectively. However, this should not be viewed as limiting in any way. For example, in alternate embodiments, the hinge elements 121, 122 may assume any other suitable shape or cross-section. They may also be coupled to other portions of the sidewalls 133, 135.

In the embodiment shown in FIGS. 1A–1B, the cavity 140 is shown to be generally rectangular in shape. However, in alternate embodiments, the cavity 140 may assume any other suitable geometric form. The cavity 140 may include at least one electrode 141, which may be disposed on a bottom surface 150 of the cavity 140. The electrode 141 is adapted to cause the bulk element 110 to be actuated in a known manner (e.g., in an electrostatic fashion). Moreover, the device surface 112 of the bulk element 110 may be optically reflective, e.g., by way of polishing and/or depositing a metallic film on the surface.

FIG. 2 shows a schematic side sectional view of a second embodiment of a MEMS apparatus. By way of example, MEMS apparatus 200 may comprise a bulk element 210; first and second hinge elements 221, 222; and a support 230. The bulk element 210 may include a "device" (or "top") surface 212, and a "bottom" surface 211 which is disposed below and opposes the device surface 212. In this embodiment, the bulk element 210 may further include a base portion 215, which may extend downward from the bottom surface 211. The first and second hinge elements 221, 222 are each disposed below the device surface 212. As a way of example, the first and second hinge elements 221, 222 are each shown to be coupled to the base portion 215 of the bulk element 110 on one end and to the support 130 on the other. In this manner, the bulk element 210 is suspended with the hinge elements 221, 222 disposed wholly underneath the device surface 212.

In the embodiment of FIG. 2, the support 230 may include a substrate portion 231 and a cavity 240. By way of example, the substrate portion 231 may be generally rectangular in shape. A plurality of sidewalls 233, 235 extend from the portion 231 and thereby form the cavity 240. The hinge elements 221, 222 are disposed within the cavity 240. In the present embodiment, the hinge elements 221, 222 may extend in a generally horizontal direction, thereby coupling the base portion 215 to the sidewalls 233, 235, respectively. However, this should not be viewed as limiting in any way. For example, in alternate embodiments, the hinge elements 221, 222 may assume any other suitable shape. They may also be positioned in other directions, and/or coupled to other portions of the sidewalls 233, 235.

The cavity 240 may be of any suitable shape in the embodiment of FIG. 2. The cavity 240 may include at least one electrode 241, which may be disposed on a bottom surface 250 of the cavity 240. The electrode 241 is adapted to cause the bulk element 210 to be actuated in a known manner (e.g., electro-statically). The device surface 212 of the bulk element 210 may likewise be optically reflective, e.g., by way of polishing and/or depositing a metallic film on the surface.

Figure 3:
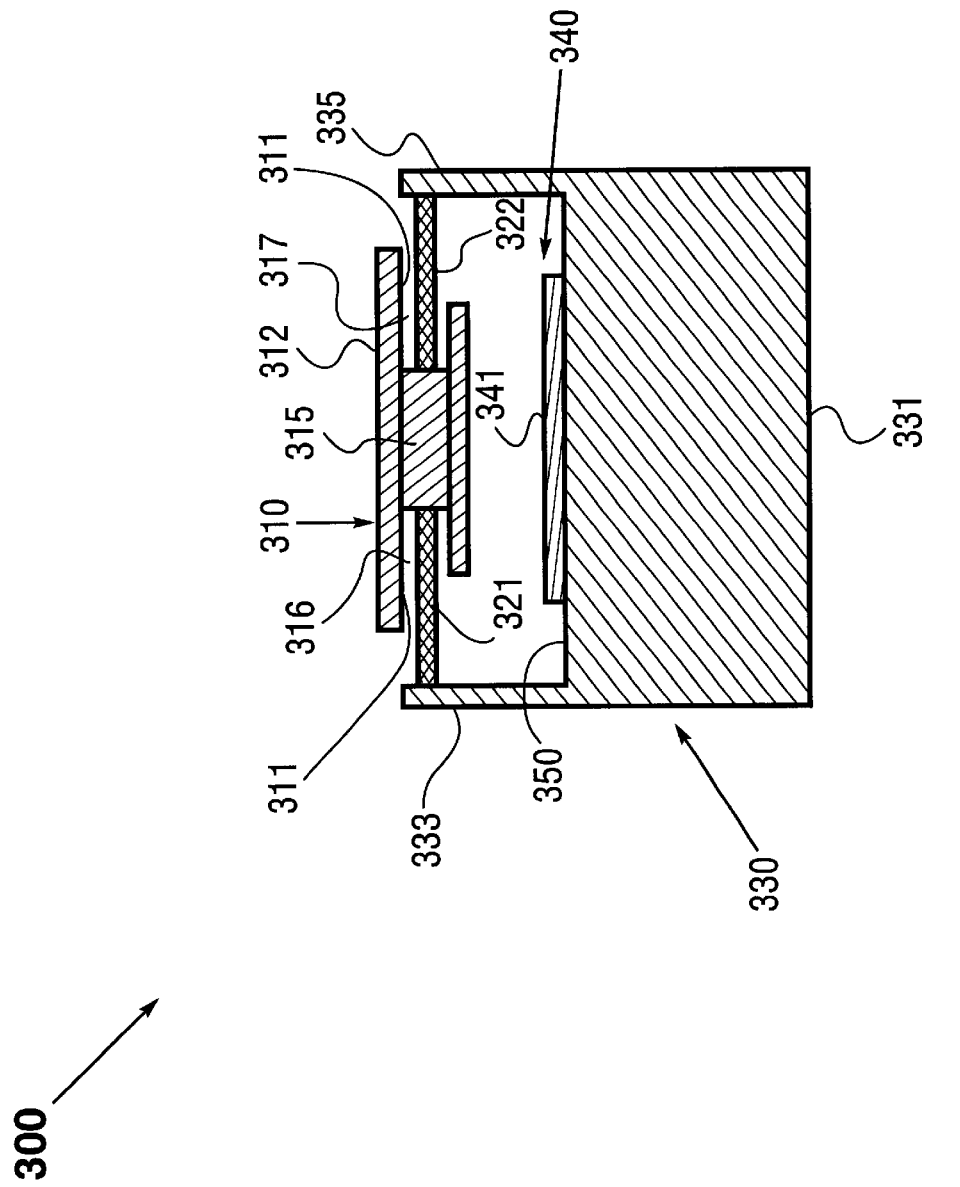
FIG. 3 is a schematic side sectional view of a third embodiment of a MEMS apparatus, according to the present invention.

FIG. 3 shows a schematic side sectional view of a third embodiment of a MEMS apparatus 300. With the exception of a bulk element 310, MEMS apparatus 300 is shown to be substantially similar to the MEMS apparatus 200, and may make use of the general configuration of and a number of the elements shown in FIG. 2. As shown in FIG. 3, the MEMS apparatus 300 may comprise a bulk element 310; first and second hinge elements 321, 322; and a support 330. The support 330 may include a cavity 340, which is formed by at least two sidewalls 333, 335 that extend from substrate portion 331. The cavity 340 may include a bottom surface 350, on which at least one electrode 341 may be disposed.

In the MEMS apparatus 300, the bulk element 310 may include a "device" (or "top") surface 312, and a "bottom" surface 311 which is disposed below and opposes the device surface 312. As a way of example, the bulk element 310 is shown to include a generally "T"-shaped base portion 315. The base portion 315 extends downward from the bottom surface 311 and forms side cavities or "voids" 316, 317 in the bulk element 310. As in the embodiment of FIG. 2, the first and second hinge elements 321, 322 are each disposed beneath the bottom surface 311 of the bulk element 310. In the present embodiment, the hinge elements 321, 322 are each shown to be coupled to the base portion 315 of the bulk element 310 within the respective voids 316, 317 on one end and to the respective sidewalls 333, 335 of the support 330 on the other. In this manner, the bulk element 310 is suspended with the hinge elements 321, 322 disposed wholly underneath the device surface 312.

In the foregoing embodiments and in an exemplary fabrication process described below, the term "bulk element" (e.g., the bulk element 110, 210, or 310) refers to an element fabricated by bulk micromachining techniques known in the art, which typically comprises a single-crystal material. For example, the bulk elements 110, 210, 310 shown above may each be a single-crystal silicon element. The bulk element is characterized by a "device" surface and a "bottom" surface that is situated below the device surface; while the bulk element itself may assume any geometric form that is appropriate for a given application. (It will be appreciated that the device and bottom surfaces need not be opposing one another, in general.) The "device" surface of a bulk element may be optically reflective. An optical element (e.g., a grating) may also be patterned on it. Additionally, the device surface may be used as an "interface" for coupling the bulk element to other devices, if so desired in practical applications.

Further, a "support" (e.g., the support 130, 230, or 330) may be a frame or substrate, to which the bulk element is attached. A "hinge" (or "hinge element") should be construed broadly as any suspension/coupling means that enables the bulk element to be suspended from the support and further provides the restoring force as the bulk element undergoes motion (e.g., due to the actuation mechanism caused by the electrode 141 of FIGS. 1A–1B). As a way of example, the first or second hinge element shown in FIG. 1A, 2, or 3 may be a flexure or flexible coupling, e.g., fabricated by bulk or surface micromachining techniques known in the art. While two hinge elements are shown in each of the foregoing embodiments, alternate embodiments may include a fewer or greater number of hinge elements. The term "underneath" refers to a hinge element being anchored to (or below) the bottom surface of the bulk element and thereby disposed wholly beneath the device surface. This allows the device surface of the bulk element to be maximized and the entire surface to be usable (e.g., for optical beam manipulation), as the above embodiments illustrate.

Figure 4A:
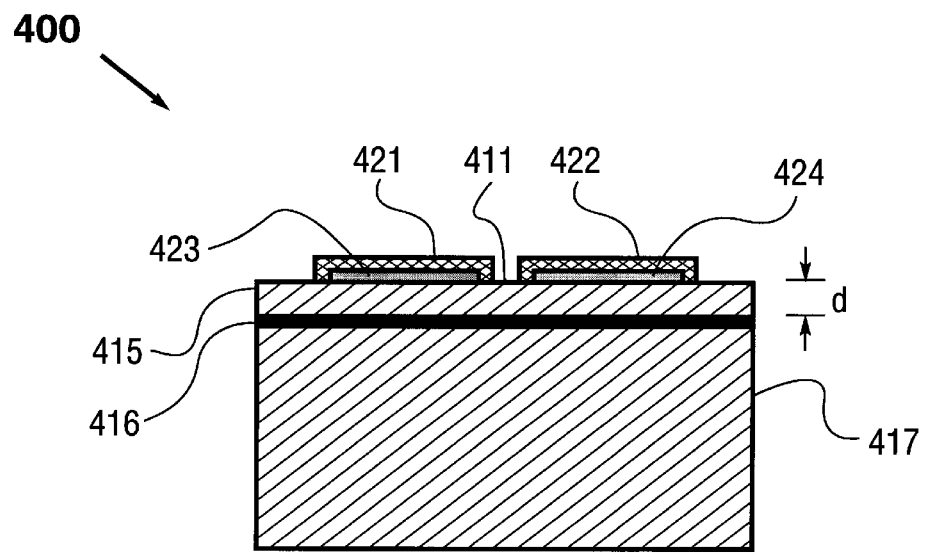
FIGS. 4A–4F show an exemplary process flow for fabricating a MEMS apparatus, according to the present invention.

FIGS. 4A–4F show an exemplary embodiment of a process flow, which may be utilized for fabricating a MEMS apparatus (e.g., the embodiment of FIGS. 1A–1B) according to the present invention. FIG. 4A shows a schematic side sectional view of a "device" component 400, which in one form may be an SOI (Silicon On Insulator) wafer, comprising a single-crystal silicon "device" layer 415 and a silicon "handle wafer" 417 with a first insulation layer 416 (e.g., silicon oxide) sandwiched therein between. The single-crystal silicon device layer 415 may have a predetermined thickness d, which may be on the order of 5–100 $\mu$m. First and second hinge elements 421, 422 are fabricated on a first surface 411 of the single-crystal silicon device layer 415 in a known manner, e.g., by a known surface micromachining technique. Each hinge element may be a thin-film, e.g., composed of polysilicon, polyoxide, nitride, silicon nitride, silicon oxide, silicon oxynitride, or a metal. First and second "sacrificial" elements 423, 424 (which may be formed from silicon oxide) may be first patterned on the first surface 411, prior to forming the first and second hinge elements 421, 422, respectively.

Figure 4B:
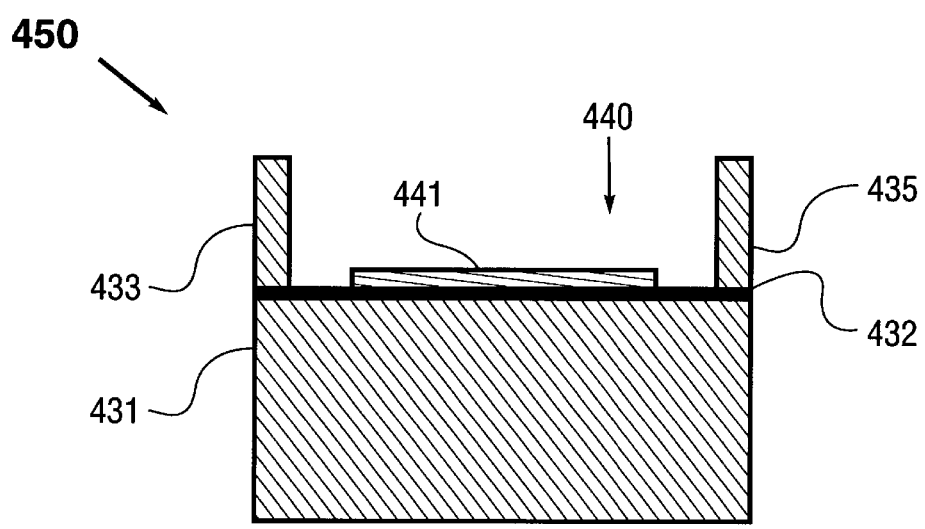

FIG. 4B shows a schematic side sectional view of a "support" component 450 containing an "open-ended" cavity 440. As a way of example, the cavity 440 may be formed by a substrate wafer 431 and a plurality of spacers 433, 435 which form sidewalls of the cavity 440. There may be at least one electrode 441 disposed in the cavity 440, e.g., patterned on the substrate wafer 431 via a second insulation layer 432 which may be made of silicon oxide.

Figure 4C:
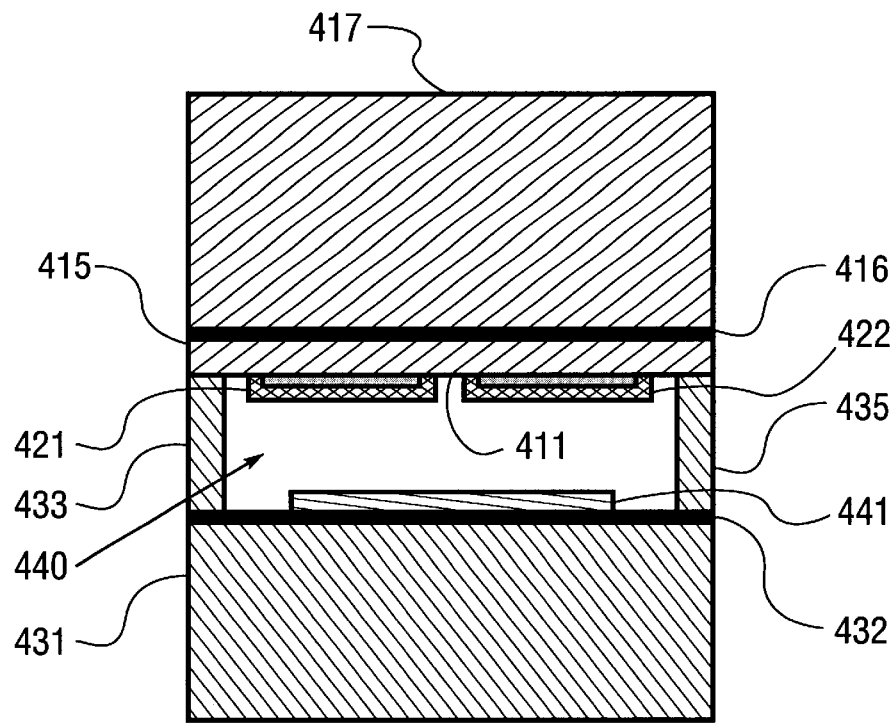
Figure 4D:
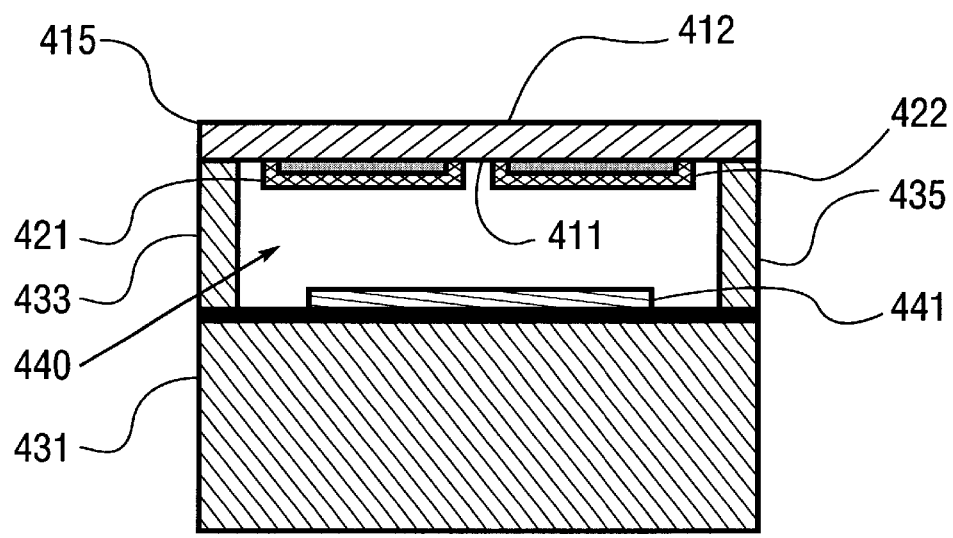

Referring now to FIG. 4C. The device component 400 formed in FIG. 4A is bonded with the support component 450 of FIG. 4B in such a manner that the first and second hinge elements 421, 422 are disposed (or accommodated) within the cavity 440. In the next step of the fabrication process flow, illustrated in FIG. 4D, the silicon handle wafer 417 (along with the first insulation layer 416) is removed, thereby revealing a second surface 412 of the single-crystal silicon device layer 415.

Figure 4E:
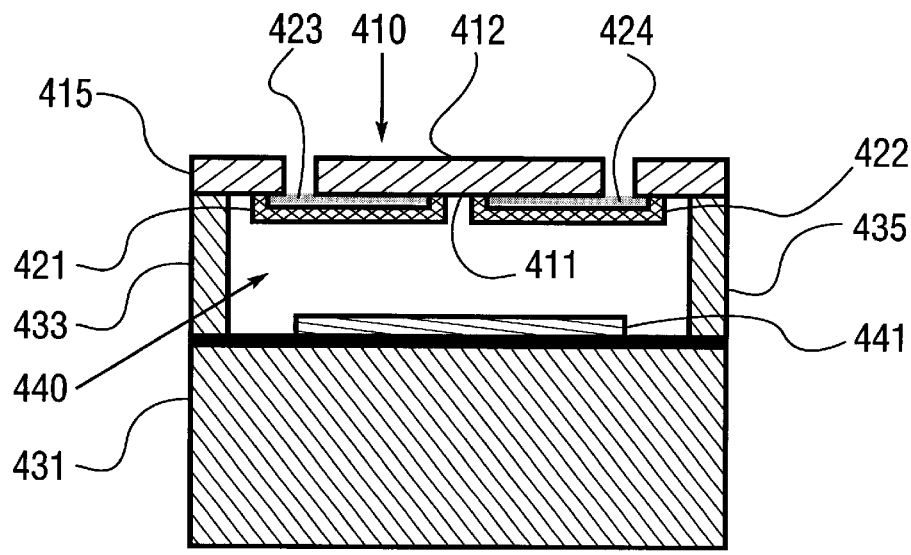
Figure 4F:
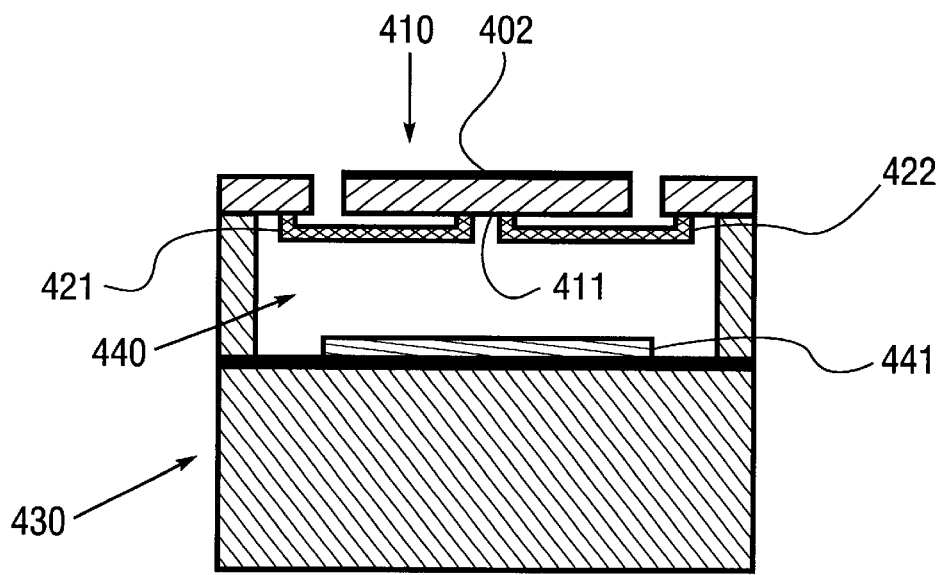

In the subsequent step of the fabrication process flow, depicted in FIG. 4E, a "bulk element" 410 is formed in the single-crystal silicon device layer 415 by a known bulk micromachining technique (e.g., a DRIE (Deep Reactive Ion Etching) process) known in the art. The formed bulk element 410 is also characterized by the first and second surfaces 411, 412 that oppose one another. In the next step of the fabrication process flow, shown in FIG. 4F, the bulk element 410 is "released", e.g., by removing the first and second sacrificial elements 423, 424. Note that the remainder of the single-crystal silicon device layer 415, the spacers 433, 435, and the support wafer 431 form an integrated support structure 430, which may substantially constitute the support 130 in the embodiment of FIGS. 1A–1B, for instance. (Those skilled in the art will appreciate that first and second sacrificial elements 423, 424 may also be removed earlier, e.g., anywhere in the fabrication process flow after the step of FIG. 4A.)

A reflective layer 402 (e.g., a gold film) may be further deposited on the second surface 412 of the bulk element 410, rendering the apparatus thus constructed a MEMS mirror. Note that because the first and second hinge elements 421, 422 are anchored to the first (or "bottom") surface 411 and thereby wholly "underneath" the bulk element 410 thus produced, the second (or "device") surface 412 of the bulk element 410 can be maximized and the entire surface becomes usable (e.g., for optical reflection). Furthermore, being situated in a cavity (e.g., the cavity 440), the first and second hinge elements 421, 422 can be made sufficiently long/large, if so desired in a given application.

In the aforementioned process flow, use of an SOI wafer for the device component 400 of FIG. 4A has the advantages of providing precise control of the thickness of the bulk element 410 (by way of the predetermined thickness d of the single-crystal silicon device layer of the SOI wafer) and ease in manipulation (owing to the handle wafer of the SOI wafer), while the intervening insulation layer of the SOI wafer may serve as a convenient "etch-stop" (e.g., when removing the handle wafer). The hinge elements may also be fabricated by a known bulk micromachining technique (e.g., the SCREAM (Single Crystal Reactive Etching and Metallization) process known in the art). It will be appreciated, however, that a device component in the present invention may alternatively be formed in an epitaxial silicon wafer, or a single piece of single-crystal silicon, where the hinge elements may be fabricated in a manner similar to that described above.

The support component 450 of FIG. 4B may likewise be fabricated out of an SOI wafer which may be similar to that shown in FIG. 4A in configuration. As a way of example, the silicon device layer (e.g., 50–100 μm in thickness) of the SOI wafer may be used to form the spacers 433, 435 along with the electrode 441 (e.g., by way of etching), while the corresponding handle wafer may serve as the substrate wafer 431. Alternatively, a glass wafer may be used to form the substrate wafer 431, on which the electrode 441 may be deposited (e.g., by a known surface micromachining technique) and the spacers 433, 435 (e.g., made of silicon) bonded. The support component 450 of FIG. 4B may also be fabricated out of a single piece of a desired material (e.g., a silicon or glass wafer) using an appropriate technique known in the art. Those skilled in the art will appreciate that a support component in the present invention may generally be configured in any way that is suitable for a given application; what is important is that the support element thus configured contains an open-ended cavity (so as to host the hinge elements), e.g., in a manner as illustrated with respect to FIG. 4B.

A distinct feature of the fabrication process flow of FIGS. 4A–4F is that the device component 400 and the support component 450 are bonded in such a manner that the hinge elements are disposed within (or accommodated by) the cavity 440 of the support component 450 (e.g., see FIG. 4C above), thereby allowing the hinge elements to be situated "underneath" the bulk element thus produced. One skilled in the art will know how to apply a suitable process known in the art that is effective for carrying out the requisite bonding (e.g., fusion or anodic bonding). It will be appreciated that various elements in the embodiment of FIGS. 4A–4F are shown as a way of example to illustrate the general principles of the present invention, and therefore are not drawn to scale (e.g., in either geometric shape or size). From the teaching of the present invention, those skilled in the art will know how to implement the fabrication process flow of FIGS. 4A–4F in a given application, to produce a suitable MEMS apparatus according to the present invention.

An advantage of the MEMS apparatus of the present invention is that by placing the hinge elements underneath the bulk element, the device surface of the bulk element can be maximized and the entire surface becomes usable (e.g., for optical beam manipulation). Such a feature would be highly advantageous in making arrayed MEMS devices, such as an array of MEMS mirrors with a high optical fill factor. Further, by advantageously making use of a combination of bulk and surface micromachining techniques, a MEMS mirror according to the present invention may be equipped with a large and flat mirror along with flexible hinges, thereby capable of providing a substantial rotational range at moderate electrostatic drive voltages. An additional advantage of the MEMS apparatus of the present invention is evident in its monolithic structure, rendering it robust in performance. These advantageous features are in notable contrast with the prior devices described above. As such, the present invention may be used in a variety of applications, e.g., providing arrayed MEMS mirrors (or beam steering devices) for optical networking applications.

Those skilled in the art will recognize that the exemplary embodiments described above are provided by way of example to illustrate the general principles of the present invention. Various means and methods can be devised herein to perform the designated functions in an equivalent manner. Moreover, various changes, substitutions, and alternations can be made herein without departing from the principles and the scope of the invention. Accordingly, the scope of the present invention should be determined by the following claims and their legal equivalents.

What is claimed is:

1. An optical apparatus comprising:
    a) a bulk element having an optical surface and a bottom surface, disposed below said optical surface;
    b) a support, including a cavity formed by a plurality of sidewalls; and
    c) first and second hinge elements, which are disposed below said bottom surface, and which are directly coupled to said bulk element and to a pair of said sidewalls, effective to suspend said bulk element from said support.

2. The optical apparatus of claim 1 wherein said bulk element comprises single-crystal silicon.

3. The optical apparatus of claim 1 wherein said optical surface is reflective.

4. The optical apparatus of claim 3 wherein said optical surface comprises a reflective layer.

5. The optical apparatus of claim 4 wherein said reflective layer comprises a material selected from the group consisting of gold, aluminum, silver, and copper.

6. The optical apparatus of claim 1 wherein said first and second hinge elements are formed from a material selected from the group consisting of polysilicon, polyoxide, nitride, silicon nitride, silicon dioxide, silicon oxynitride, single-crystal silicon, and metals.

7. The optical apparatus of claim 1 wherein said support is made of silicon.

8. The optical apparatus of claim 1 wherein said support further comprises at least one electrode disposed in said cavity, for causing said bulk element to be actuated.

9. The optical apparatus of claim 1 wherein each of said sidewalls includes a ridge portion that is inwardly projecting, and wherein each of said hinge elements is coupled to a unique one of said ridge portions.

10. The optical apparatus of claim 9 wherein each of said hinge elements is further coupled to said bottom surface.

11. The optical apparatus of claim 1 wherein said bulk element further comprises a base portion which extends downward from said bottom surface, and wherein each of said hinge elements is coupled to said base portion.

12. An optical apparatus comprising:
 a plurality of MEMS devices configured in an array, wherein each MEMS device includes:
  d) a bulk element having an optical surface and a bottom surface, disposed below said optical surface;
  e) a support, including a cavity formed by a plurality of sidewalls; and
  f) first and second hinge elements, which are disposed below said bottom surface, and which are directly coupled to said bulk element and to a pair of said sidewalls, effective to suspend said bulk element from said support.

13. The optical apparatus of claim 12 wherein said bulk element comprises single-crystal silicon.

14. The optical apparatus of claim 12 wherein said first and second hinge elements are formed from a material selected from the group consisting of polysilicon, polyoxide, nitride, silicon nitride, silicon dioxide, silicon oxynitride, single-crystal silicon, and metals.

15. The optical apparatus of claim 1 wherein said optical surface is reflective.

16. The optical apparatus of claim 12 wherein said support further comprises at least one electrode disposed in said cavity, for causing said bulk element to be actuated.

* * * * *